United States Patent [19]
Olsen et al.

[11] Patent Number: 5,910,716
[45] Date of Patent: Jun. 8, 1999

[54] BRUSHLESS DC MOTOR DRIVE

[75] Inventors: Curtis O. Olsen, Oakdale; Guy J. Patyk, Hopkins, both of Minn.

[73] Assignee: Reliance Electric Industrial Company, Cleveland, Ohio

[21] Appl. No.: 08/991,174

[22] Filed: Dec. 16, 1997

[51] Int. Cl.$^6$ ............................................. H02P 6/08
[52] U.S. Cl. ........................... 318/254; 318/272; 318/439
[58] Field of Search .................................... 318/138, 254, 318/268, 272, 439, 461, 465; 388/916

[56] References Cited

U.S. PATENT DOCUMENTS

| | | |
|---|---|---|
| 4,288,839 | 9/1981 | Prager et al. . |
| 4,605,986 | 8/1986 | Bentz et al. . |
| 4,608,524 | 8/1986 | Yokobori ................................. 318/254 |
| 4,707,726 | 11/1987 | Tinder . |
| 4,840,222 | 6/1989 | Lakin et al. .............................. 165/47 |
| 4,923,179 | 5/1990 | Mikolajczak . |
| 4,942,344 | 7/1990 | Devitt et al. ............................ 318/254 |
| 4,972,294 | 11/1990 | Moses, Jr. et al. . |
| 5,060,112 | 10/1991 | Cocconi . |
| 5,557,182 | 9/1996 | Hollenbeck et al. ................... 318/432 |
| 5,661,382 | 8/1997 | Enami et al. ........................... 318/439 |
| 5,723,957 | 3/1998 | Ishikawa ................................. 318/254 |

OTHER PUBLICATIONS

Fasco, "3.3 Brushless DC, Electronically Commutated Fasco type 04, 1/30 to 1/4 H.P.", date and page Nos. unknown (a brochure).
Machine Design, "Appliance Industry Focus", pp. 73–75, Aug. 8, 1996.
Appliance Manufacturer, "Designing With An Aim" p. 63, Jul. 1996.
Control Engineering, "What's Driving Drives?", p. 41, Mar. 1996.
Eastern Air Device, Inc. "Motor Works in Harsh Areas", date and page Nos. Unknown (an advertising page).
Grundfos, "Motors With A Difference", Denmark, date and pages unknown (three advertising pages).
Control Engineering, "Ultimate Motor–to–Controller Matching" pp. 48 and 50, Dec. 1995.
Control Engineering, "Adjustable–speed drive and induction motor in single package" p. 97, Jan. 1996.
New Equipment Digest, "Efficient, Easy–To–Install Motor/Drive Package", p. 63, Jan. 1996.
Appliance Manufacturer, "Motors/Drives, Fans, Blowers, Compressors" p. 72, Feb. 1996.
Appliance Manufacturer, "The EFM Motor's Electronics Monitor System Conditions and Adjusts Automatically to Deliver The Specified Volume of Air A Heating or Cooling System Is Designed to Use" p. 66, Apr. 1996.
Machine Design, "NDES '96 Gears Up For Innovation" p. 70, Mar. 7, 1996.

(List continued on next page.)

*Primary Examiner*—Bentsu Ro
*Attorney, Agent, or Firm*—Patrick S. Yoder; John J. Horn; John M. Miller

[57] ABSTRACT

A brushless DC motor drive is disclosed which includes drive and control circuitry incorporated into an integrated drive unit. The drive circuitry includes a ground offset or signal conditioning circuit which receives command input signals from a command device and corrects for variations in ground potential between the power source and to the drive. The corrected command signal is used for closed-loop velocity control of a brushless DC motor. The signal conditioning circuit also provides a reference voltage signal for use by a controller which controls the drive circuitry. The command input signal is also applied to an energy conservation circuit. The circuit applies power to the control circuit only when the command is above a preset threshold. When the command is below the threshold level, power is interrupted to the control circuit to reduce the energy consumption of the system.

18 Claims, 11 Drawing Sheets

OTHER PUBLICATIONS

National Design Engineering Show '96, "Inverter Motor Unit" p. 80, Mar. 1996.
Control Engineering, "AC Inverter and Motor" p. 80, Dec. 1995.
Framo, "Frequenzumrichter—Motor FUMO" page and date unknown (three advertising pages).
Show Daily News, "Baldor to debut "smart" motor" page and date unknown (one advertising page).
Machine Design, "Gearing Up For Intellegent Motors", p. 54, Jul. 13, 1995.
PCIM, "Complete 32–Bit Motion System Resides in Motor Housing" pp. 28–32, Oct. 1994, California.
Animatics Corp., "Animatics SmartMotor Integral Brushless D.C. Motor, Controller, Amplifier & Encoder Users Manual", date unknown, California (a control brochure).

PCIM, "Integrated Motion System Simplifies Design, Improves Performance of Semiconductor Processing Equipment", pp. 44–45, Jan. 1995, California.

"Motor with Onboard Drive Could Become Major Trend", author, page and date unkonwn (an analysis).

Emerson, "Controlled Induction Motor Systems" page and date unknown (Emerson Motor Company advertorial.).

Power Transmission Design, "Brushless DC Drive", pp. 50–53, 1993.

Appliance Manufacturer, "On–Motor Control" pp. 29–30, Oct. 1997.

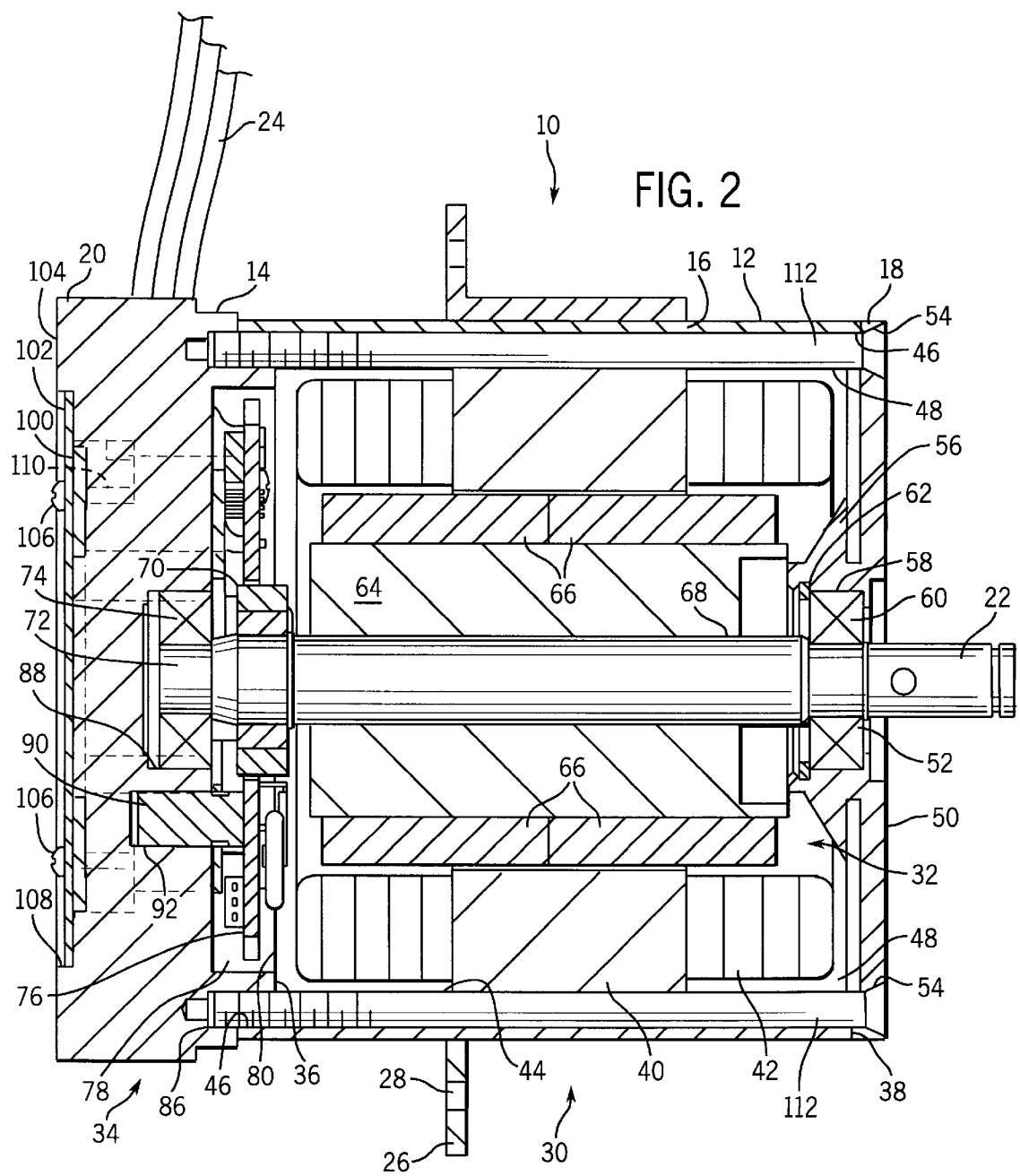

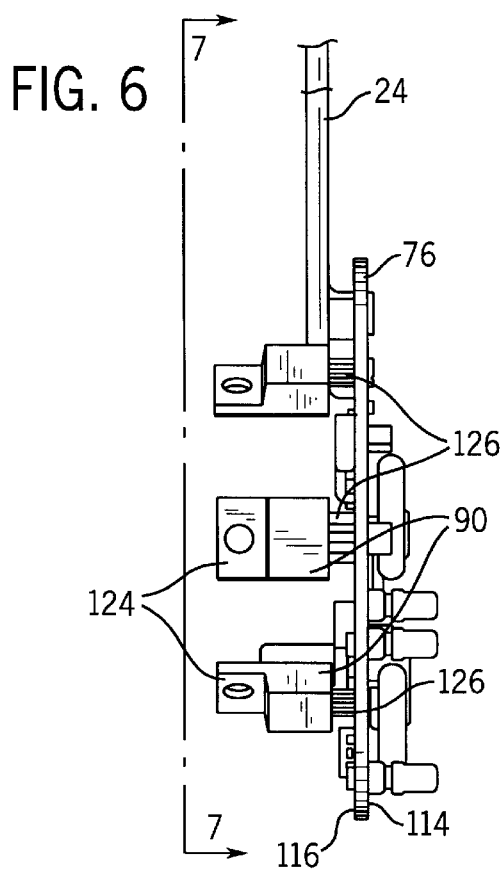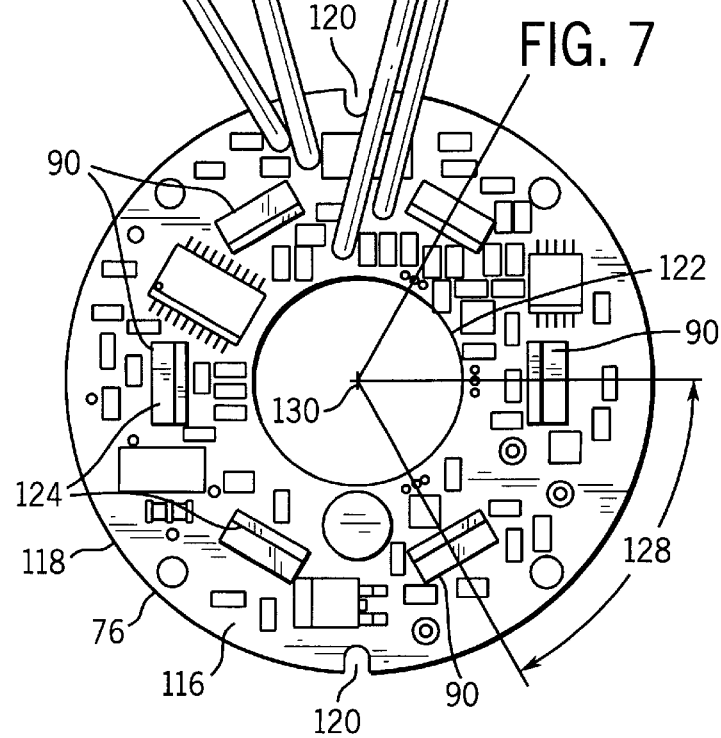

BRUSHLESS DC MOTOR DRIVE

BACKGROUND OF THE INVENTION

1. Field of the Invention

The present invention relates to brushless DC motor drives of the type configured for receiving electrical energy from a source. More particularly, the invention relates to a brushless DC motor drive suitable for use in the vehicular applications and the like, which is adapted to maintain accurate speed control of a brushless DC motor despite variations in the ground potential from the source. The invention also relates to a drive of this type which is adapted to draw a minimal amount of electrical energy when the associated motor is not being driven.

2. Description of the Related Art

Various motor configurations are known and are currently in use for driving equipment, such as fans and blowers in systems powered by a direct current source. Such applications often arise in vehicular systems, such as air conditioners, refrigeration units and the like provided on automobiles, buses, trucks, trailers, recreational vehicles and so forth. Many such applications employ conventional DC motors including a commutator and brushes. The rotational speed of such motors may be adjusted and controlled by control of the voltage applied to the motor. Another family of motors, often referred to as brushless DC motors, do not include a comutator and brushes, and are driven at speeds that are a function of the frequency or duty cycle of pulsed drive energy applied to the motor. In applications where the power source is a direct current system, the motor drive typically converts the direct current energy to pulse energy having a frequency or duty cycle which corresponds to the desired output speed of the motor.

Conventional brush-type DC motors offer a number of advantages, including simplicity and low cost. However, such motors suffer from serious drawbacks in a number of applications. For example, due to their inherent design, conventional brush type DC motors may have an extremely limited life (e.g. 2500 to 3000 hours). In applications where the motors are driven for extended periods each day, this limited life may result in frequent servicing of the systems in which the motors are installed, typically for replacement of the motors themselves.

Another drawback of conventional brush-type DC motors is their tendency to experience speed fluctuations due to variations in the voltage applied to the motors. Such variations may occur for an individual motor during different periods of operation of a vehicle, for example while climbing an incline, accelerating, idling and so forth. Also, voltage variations may occur between individual motors coupled to a common direct current source due to voltage drops in conductors connected between the source and the motors. Hence, in systems including a number of direct current motors, each motor may receive different supply voltages depending upon their location and the length of conductor between the source and the motors. Such voltage variations ultimately result in a lack of uniformity and precision in the speed control of the motors.

Conventional brush-type DC systems employ relays and contactors which physically interrupt electrical current carrying paths to the motors when they are not being driven. However, such relays and contactors add significantly to the size and cost of the motor package and drive system.

While brushless DC motors, driven by microprocessor-based drive circuitry may overcome certain of the drawbacks of brush-type motors, they have not conventionally been employed in many vehicular applications. Such drive circuitry may include closed-loop velocity control adapted to maintain output speed of a motor based upon a velocity command signal from a operator-adjustable device such as a potentiometer, or from an automatic controller. However, where voltage variations from the direct current source occur in the vehicles, even though the velocity command signals may not be affected, undesirable speed fluctuations may occur despite the closed-loop control circuitry, in much the same way as described above for conventional brush-type DC motors. Moreover, brushless DC motor drive circuits do not adequately avoid the problem of current draw during periods when the motor is not being driven. In particular, microprocessor-based brushless DC motor drive circuitry typically continues to draw undesirable current at levels sufficient to potentially drain the power source even when the motor velocity command signal is substantially zero.

There is need, therefore, for an improved brushless DC motor drive that is relatively insensitive to variations in ground potential from a power source, resulting both from changes in the load on the power source and from variations in the length of conductors linking the power source to individual motors in a system. Moreover, there is a need for an improved brushless DC drive system which avoids the problem of energy consumption due to current draw when the motor is not being driven.

SUMMARY OF THE INVENTION

The present invention provides a brushless DC motor drive designed to the response to these needs. The drive is particularly well suited to vehicular applications, such as for driving fans, blowers and the like in heating, ventilating and air conditioning systems as well as in refrigeration and other systems. The drive incorporates a novel circuit design which establishes a uniform ground potential for a voltage command signal. The circuit thus enables the voltage command signal to be normalized despite variations in the load on the power source or the location of individual motors in a system. The drive circuitry also offers a "sleep mode" or energy conservation feature designed to significantly reduce the current draw of the system in periods when the motor is not being driven. The sleep mode feature preferably functions based upon the level of the command signal, such that the circuit enters into a low-energy mode when the command signal falls below a predetermined threshold.

Thus, in accordance with the first aspect of the invention, a motor drive is provided for driving a brushless DC motor. The motor drive includes a drive circuit, a control circuit, and a command interface circuit. The drive circuit converts electrical energy from a source to controlled pulsed energy. The control circuit is coupled to the drive circuit and generates control signals, applying the control signals to the drive circuit for regulating the pulsed energy based upon a corrected command signal. The corrected command signal is representative of a desired operating parameter of the motor, such as the desired rotational velocity. The command interface circuit is configured to receive an input command signal which is at least partially dependent upon the characteristic of the source, and to generate a corrected command signal based upon the input command signal. The corrected command signal is substantially independent of the characteristic of the source. In a particularly preferred embodiment, the voltage command signal has a voltage level which is representative of the desired rotational velocity of the motor, and the characteristic corrected by the command interface circuit is ground potential.

In one presently preferred configuration, the command interface circuit is configured to generate a reference signal and to generate the corrected command signal based upon a comparison of the input command signal to the reference signal. The circuit may thus include an operational amplifier which receives the input command signal and generates a command correction signal based upon a reference signal which is representative of a reference ground potential. A second operational amplifier then receives the input command signal and the command correction signal and generates the corrected command signal based thereon.

In accordance with another aspect of the invention, a brushless DC motor and drive unit comprises a brushless DC motor, a drive circuit, a control circuit and a signal conditioning circuit. The motor has a housing, a rotor disposed for rotation within the housing, and a stator disposed in the housing around a portion of the rotor. A stator is configured to receive pulsed energy signals to drive the rotor in rotation. The drive circuit is configured to be coupled to a source of electrical energy and to convert electrical energy to the pulsed energy signals. The control circuit is coupled to the drive circuit and generates control signals, applying the control signals to the drive circuit for controlling the pulsed energy signals based upon a command signal. The signal conditioning circuit is coupled to the control circuit, and receives an input signal which is at least partially dependent upon a characteristic of the DC source. The signal conditioning circuit generates the command signal from the input signal such that the command signal is substantially independent of the characteristic of the source.

In accordance with a further aspect of the invention, a motor drive is provided for controlling a brushless DC motor based upon a command signal. The drive includes a drive circuit, a control circuit and an energy conservation circuit. The drive circuit is configured to be coupled to a source of energy and to convert the energy to pulsed drive signals. The control circuit is coupled to the drive circuit and generates control signals, applying the control signals to the drive circuit for controlling the pulsed energy signals. The energy conservation circuit is coupled to the control circuit and is configured to receive a control signal and to complete a current carrying path to the control circuit when the control signal is above a predetermined threshold level. The energy conservation circuit interrupts the current carrying path to the control circuit when the control signal is at or below the predetermined threshold. The drive may also include a command interface circuit for correcting variations in an input command signal resulting from variations in ground potential of the source. In such cases, the control signal received by the energy conservation circuit is preferably substantially equal to the input command signal corrected by the command interface circuit.

BRIEF DESCRIPTION OF THE DRAWINGS

The foregoing and other advantages and features of the invention will become apparent upon reading the following detailed description and upon reference to the drawings in which:

FIG. 2 is a sectional view of the motor and drive package illustrated in the FIGS. 1A and 1B, along line 2—2;

FIG. 6 is a side elevational view of a circuit board on which drive and related circuitry is mounted in accordance with a presently preferred embodiment;

FIG. 7 is an end elevational view of the circuit board illustrated in FIG. 6;

DETAILED DESCRIPTION OF SPECIFIC EMBODIMENTS

Figure 1A:
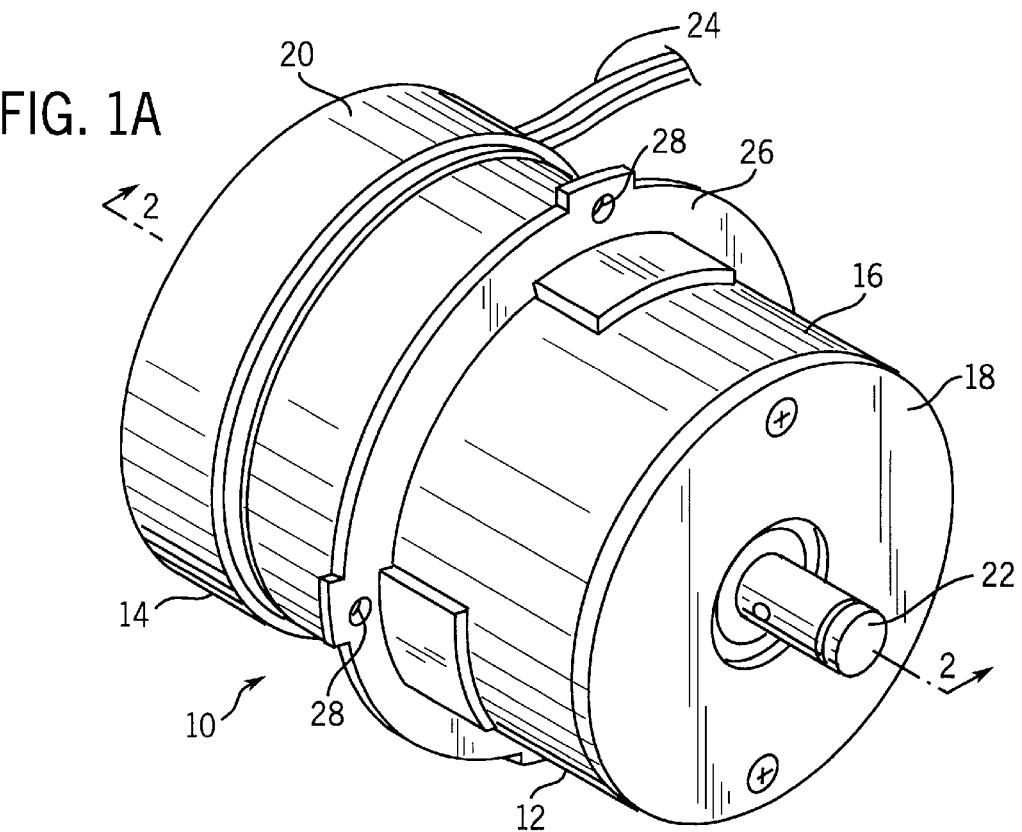
FIGS. 1A and 1B are perspective views of an electric motor and motor drive incorporating certain features of the present invention viewed from shaft and cap ends, respectively.
Figure 1B:
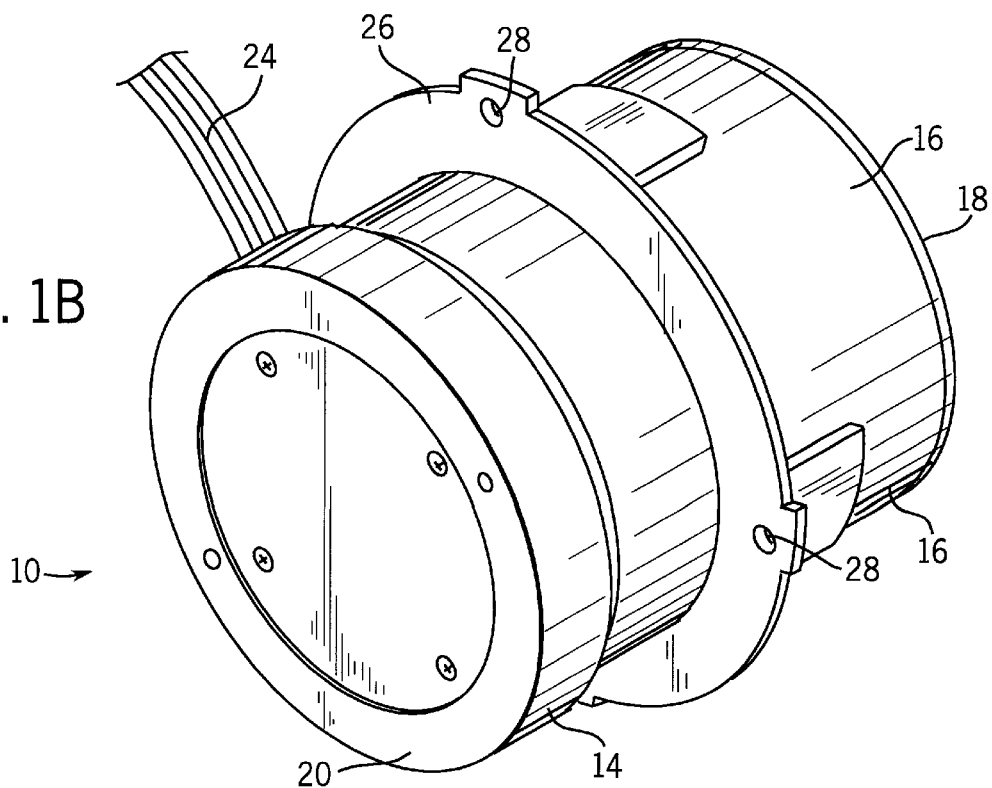

Turning now to the drawings, and referring first to FIGS. 1A and 1B, a motor and drive unit, designated generally by the reference numeral 10, is illustrated as including a brushless DC motor 12 and a drive 14 combined as a unitary package. Unit 10 includes a housing 16 covered on one end by a front end cap 18 and on an opposite end by a rear end cap 20. A driven shaft 22 extends through front end cap 18 and may be coupled to a load, such as an axial or radial fan (not shown) or other driven device. Leads 24 extend from unit 10 and are designed to be coupled to a source of electrical energy (not shown), and to a command device (not shown). The source of electrical energy may be of any suitable type, such as a 12 or 24 volt vehicle battery, or vehicle power supply system and so forth. The command device may be either a manual input device, such as a potentiometer coupled between unit 10 and a power source, or an automatic device, such as a digital or analog speed controller or automatic control circuit. In the particular embodiment illustrated in FIGS. 1A and 1B, a peripheral mounting flange 26 is secured to housing 16 and is traversed by mounting apertures 28 for receiving fasteners (not shown) permitting unit 10 to be secured in place during installation. As will be appreciated by those skilled in the art, unit 10 may also be mounted in other ways, such as via mounting aperatures (not shown) in end caps 18 or 20, or via a suitable clamp (not shown), and so forth.

Figure 3:
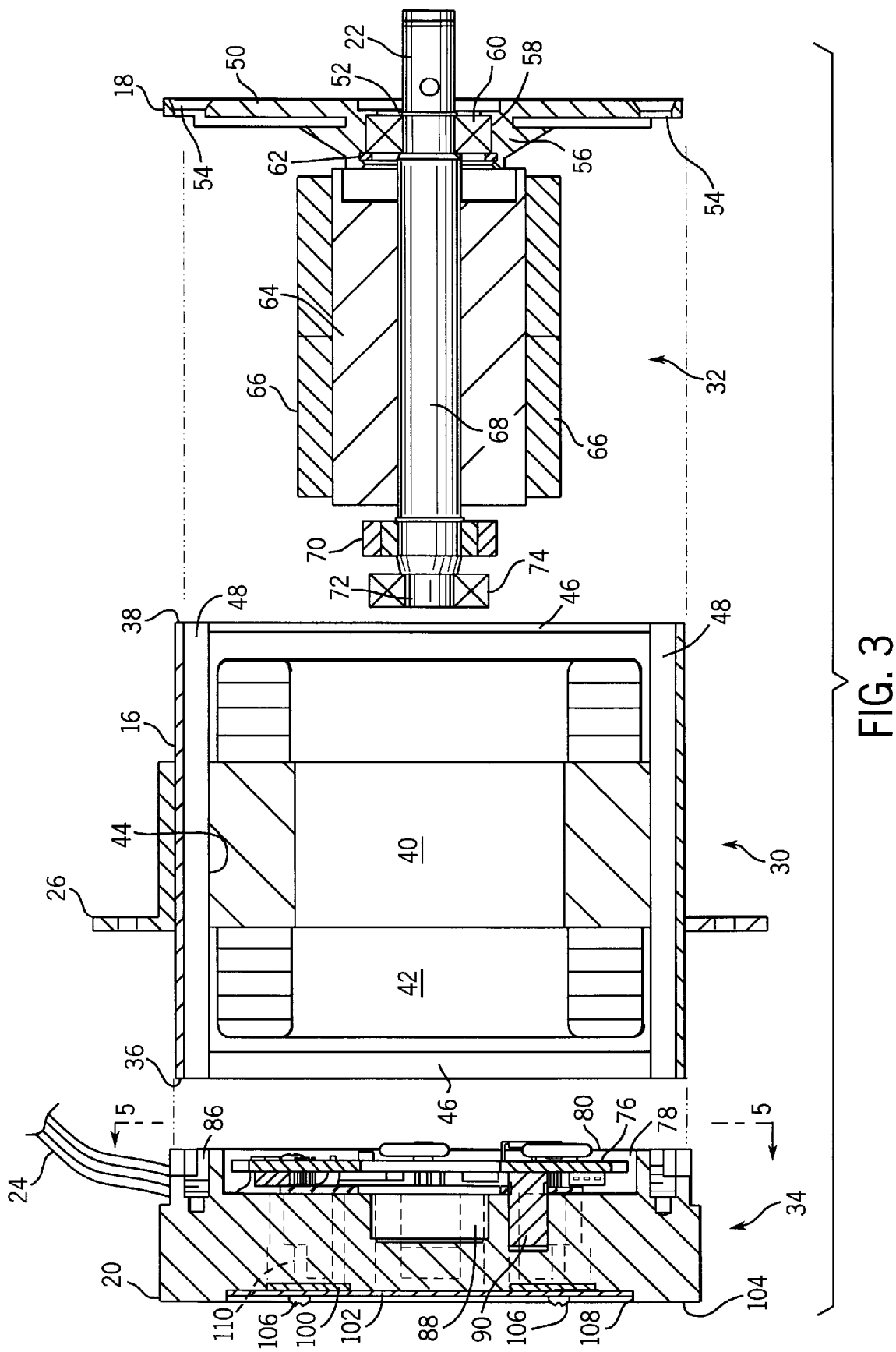
FIG. 3 is a partially exploded sectional view of the electric motor and drive package of FIG. 2 showing the subassemblies of the internal components of the package in accordance with a presently preferred embodiment.
Figure 4:
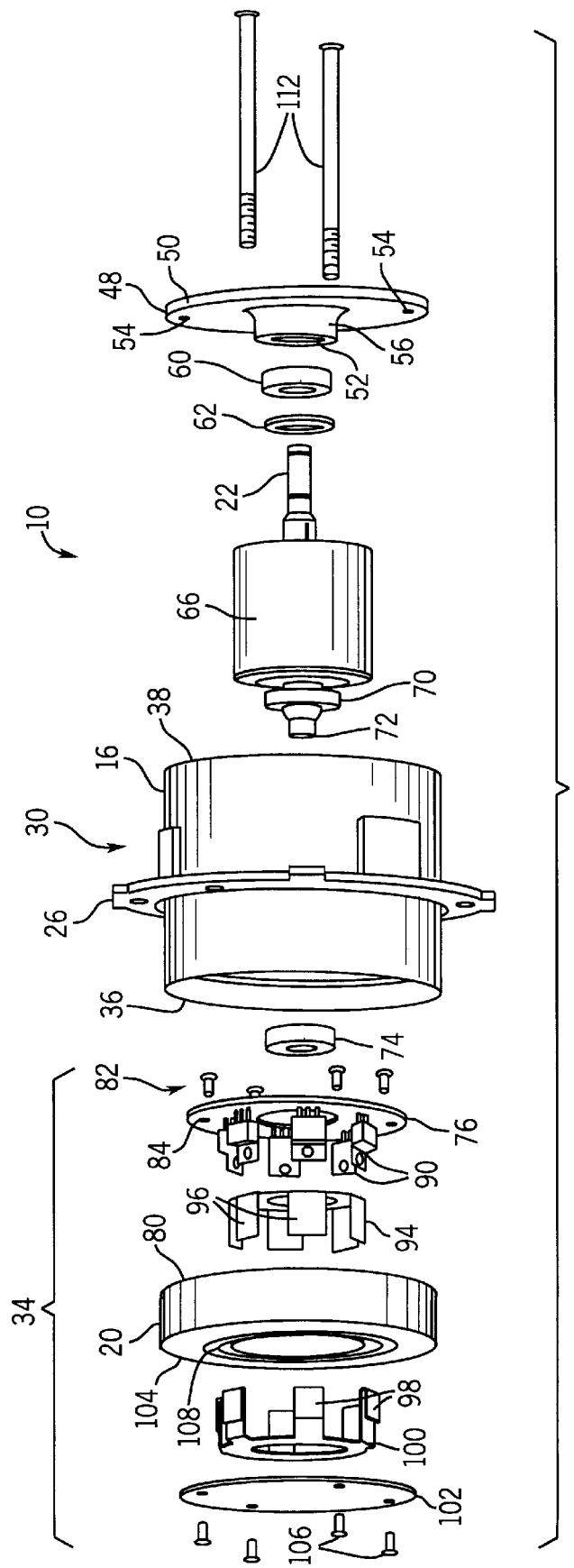
FIG. 4 is an exploded perspective view of the subassembly shown in FIG. 3 wherein certain components of the subassemblies have been further exploded to illustrate a preferred manner in which they are assembled in the package.

As best illustrated in FIGS. 2, 3 and 4, unit 10 is preferably constructed as an assemblage of independent subassemblies which may be separately manufactured and brought together in a final assembly process. Accordingly, unit 10 includes a stator/housing assembly 30, a rotor assembly 32, and a drive assembly 34. Stator/housing assembly 30 generally comprises the central portion of unit 10 formed as an annular structure having open ends for receiving rotor assembly 32 and drive assembly 34. Rotor assembly 32 closes an end of stator/housing assembly 30, and supports and positions rotary elements within stator/housing assembly 30 as described in greater detail below. In the preferred embodiment illustrated in the Figures, drive assembly 34 caps an end of assembly 30 opposite rotor assembly 32, and supports drive circuitry for controlling shaft 22 in accordance with command signals received via leads 24.

Referring more particularly now to the preferred construction of the motor subassemblies, stator/housing assembly 30 includes housing 16 formed as a cylindrical metallic shell having a first open end 36 and a second open end 38. A prefabricated metallic stator core 40, on which stator windings 42 are supported, is positioned within housing 16. Stator core 40 is preferably interference fit within an inner surface 44 of housing 16 during assembly. Stator core 40 and stator windings 42 may be of generally conventional construction in accordance with techniques well known to those skilled in the art. Housing 16 forms a pair of alignment surfaces 46 adjacent to ends 36 and 38, for receiving and properly aligning rotor assembly 32 and drive assembly 34 during final assembly of unit 10. In the particular embodiment illustrated, a pair of passages 48 are formed between stator core 40 and housing 16 for receiving elongated fasteners for securing the subassemblies of unit 10 to one another during final assembly, as described below.

Rotor assembly 32 includes front end cap 18, preferably configured as an annular metallic plate 50. A central aperture 52 is formed in the plate for permitting shaft 22 to extend therethrough. Fastener apertures 54 are formed in upper and lower positions near the periphery of plate 50 for receiving fasteners used to hold unit 10 together as a completed assembly. A support extension 56 extends rearwardly from plate 50 about central aperture 52. A bearing support recess 58 is formed in support extension 56 for receiving and supporting a bearing set 60. Bearing set 60 is fitted about shaft 22, and supports shaft 22 in rotation within unit 10. A retaining ring 62 may be provided on an inboard side of bearing set 60 for holding the bearing set in place following assembly and during operation.

Rotor assembly 32 further includes a rotor core 64 about which a series of permanent magnets 66 is secured. Core 64 is supported on a central portion 68 of shaft 22. Rotor core 64 is preferably made of a ferromagnetic alloy such as steel, and permanent magnet 66 are secured to the periphery thereof in a manner generally known in the art. A sensing magnet assembly 70 is secured adjacent to rotor core 64 for supplying feedback signals representative of the angular position of the rotor during operation, as discussed in greater detail below. Shaft 22 terminates in a support extension 72 on which a rear bearing set 74 is fixed. Bearing set 74, which may be substantially identical to bearing set 60, serves to support shaft 22, rotor core 64 and permanent magnet 66 in rotation.

Referring now to the preferred configuration of drive assembly 34, assembly 34 is preferably configured to include all circuitry required for powering stator windings 42 and thereby to drive shaft 22 in rotation, as well as control circuitry for commanding operation of the drive circuitry. Moreover, as illustrated in the Figures, in the presently preferred embodiment, drive assembly 34 serves to support bearing set 74 and to cover first end 36 of housing 16, thereby eliminating the need for a separate housing cover and mechanical support for shaft 22. Furthermore, drive assembly 34 preferably forms a heat sink which is thermally coupled to elements of the drive circuitry apt to generate significant heat during operation, so as to convey thermal energy from the drive circuitry to the ambient air during operation.

Drive assembly 34 includes a circuit board assembly 76 fitted within a recess 78 formed in a front side 80 of rear end cap 20. Fasteners 82 (see FIG. 4) extend through circuit board 76 to secure the board in place within recess 78 during assembly. Accordingly, a series of threaded apertures 84 are formed in rear end cap 20 for fixing circuit board 76 thereto (see e.g., apertures 84 illustrated in the alternative embodiment of end cap 20 shown in FIG. 10A). A pair of threaded apertures 86 are also formed within rear end cap 20 for receiving elongated fasteners for securing the subassemblies of unit 10 to one another. Also within rear end cap 20, a bearing support recess 88 is formed for receiving and supporting rear bearing set 74.

Figure 8:
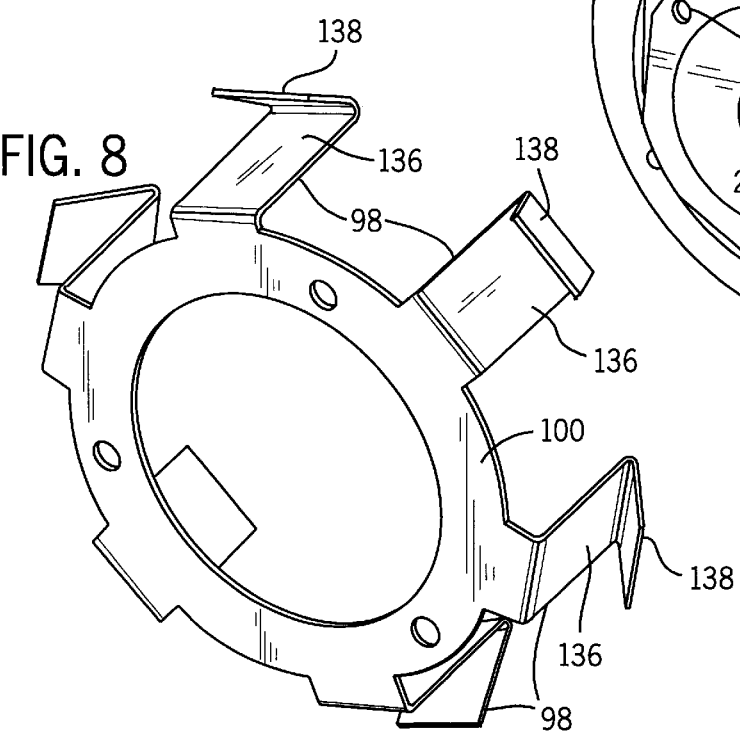
FIG. 8 is a perspective view of a biasing device for urging switching elements of the circuit board illustrated in FIGS. 6 and 7 toward thermally conductive surfaces of a heat sink in accordance with a presently preferred embodiment.

As best shown in FIGS. 4–7, circuit board 76 supports a plurality of power switching elements 90 for energizing stator windings 42 and thereby for driving shaft 22 in rotation. The preferred electrical configuration of switching elements 90 and associated drive circuitry supported on circuit board 76 will be described below with particular reference to FIGS. 9, 9A and 9B. However, physically, switching elements 90 are preferably packaged as standard lead frame devices which extend from circuit board 76 in a direction generally perpendicular to the plane of the circuit board. Recesses 92 (see FIGS. 2 and 5) are provided in rear end cap 20 extending from the front side 80 thereof at least partially therethrough. As circuit board 76 is installed on rear end cap 20, switching elements 90 extend into recesses 92 and are electrically isolated from end cap 20 by an insulative sil pad 94. Sil pad 94 includes a plurality of insulating extensions 96 which are interposed between switching elements 90 and end cap 20 as described in greater detail below. Biasing members 98 serve to urge the switching elements toward sides of recesses 92. In the preferred embodiment illustrated, a biasing member 98 is provided for each switching element 90. The biasing members are formed as single-piece clip 100 as illustrated in FIGS. 4 and 8, and as discussed in greater detail below. Clip 100 is preferably inserted into rear end cap 20 as shown in the exploded view of FIG. 4, and a cover 102 is installed over the clip to hold the clip securely in cap 20 and to substantially close the rear side 104 of end cap 20. A series of fasteners 106 extend through cover 102 and are received within rear end cap 20 to maintain cover 102 in place. As best shown in FIGS. 2 and 3, clip 100 and cover 102 are lodged within an annular recess 108 formed in rear side 104 of end cover 20. Apertures 110 are formed at a base of recess 108 for receiving fasteners 106.

The three subassemblies as described above are preferably manufactured separately and are mated with one another to complete unit 10 as best shown in FIGS. 2–4. Prior to assembly of drive assembly 34 within stator/housing assembly 30, leads (not shown) from stator windings 42 are connected to drive assembly 34 at terminals as described below with reference to FIG. 9. Drive assembly 34 is then fitted to housing end 36 and oriented so as to align apertures 86 with passages 48 of housing 16. Rotor assembly 32 is then fitted through second end 38 of housing 16. Rear bearing assembly 74 is thus fitted and supported within bearing support recess 88 of rear end cap 20, and central portion 68 of shaft 22 is positioned within housing 16 so as to align permanent magnets 16 within stator core 40. Plate 50 of front end cap 18 is fitted to second housing end 38 and oriented to align fastener apertures 54 with passages 48. Elongated fasteners 112 (see FIGS. 2 and 4) are then installed through aperture 54 and passages 48, and are threaded into fastener apertures 86 of rear end cap 20 to secure the three subassemblies to one another in the completed unit.

It should be noted that in the preferred arrangement illustrated and described above, drive assembly 34 forms an integral component of motor and drive unit 10. Moreover, housing 16 and rear end cap 20 serve to support, enclose and protect drive circuitry supported on circuit board 76. Furthermore, as described in detail below, rear end cap 20 serves as both a support for shaft 22 and as a heat sink for power switching elements 90 extending from circuit board 76.

Figure 5:
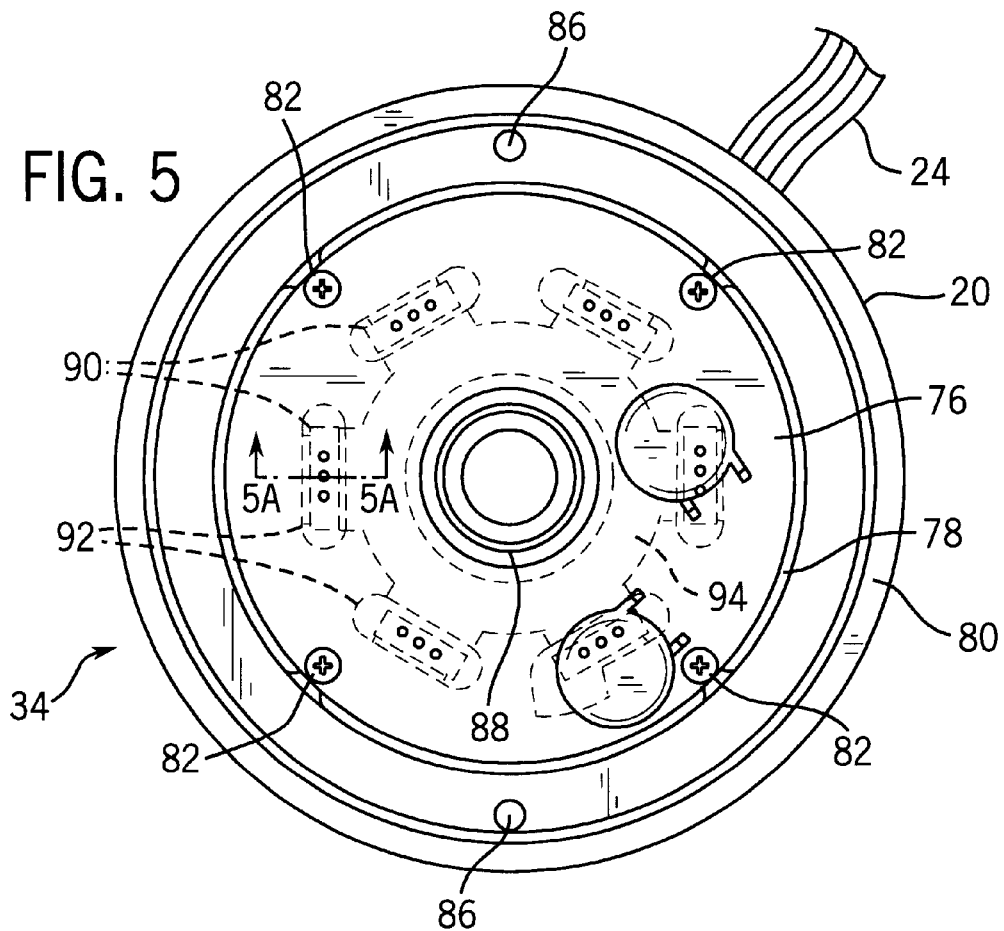
FIG. 5 is an end elevational view of the end cap and drive subassembly illustrated in FIG. 3.

Referring now more specifically to the preferred embodiment of circuit board 76, as best shown in FIGS. 5–7, circuitry for driving motor 12 is preferably supported on a generally annular board 76 having a front side 114, a rear side 116, and a substantially circular peripheral edge 118. A pair of notches 120 are formed in edge 118 to properly orient the circuit board within rear end cap 20 during installation. A central recess or aperture 122 is formed in circuit board 76 to permit passage of a portion of shaft 22 and rear bearing assembly 74 therethrough. In addition, aperture 122 serves to allow the position of sensing magnet assembly 70 to be adjacent to sensing devices following final assembly of unit 10 (see e.g., FIG. 2).

As best illustrated in FIGS. 6 and 7, to reduce the overall size of drive assembly 34, both front and rear sides 114 and 116 of circuit 76 are preferably populated with interconnected electronic control and drive components. In particular, drive components supported on rear side 116 of board 76 include six power switching elements in the form of MOSFETs and flyback diodes supported in lead frames 124 in manner well known in the art. Alternative switching elements include insulated gate bipolar transistors (IGBTs) and the like. Each lead frame 124 is electrically coupled to and mechanically supported on board 76 by a plurality of lead pins 126 extending from a base of each lead frame 124. In the preferred embodiment illustrated, the components supported on board 76 are arranged such that switching elements 90 are positioned radially in angularly equal spacing on the board. In particular, as best illustrated in FIG. 7, each switching element 90 is positioned at an angle 128, measured from a center 130 of board 76, to substantially equalize thermal loading and to enhance thermal transfer from the switching elements to rear end cap 20.

Figure 5A:
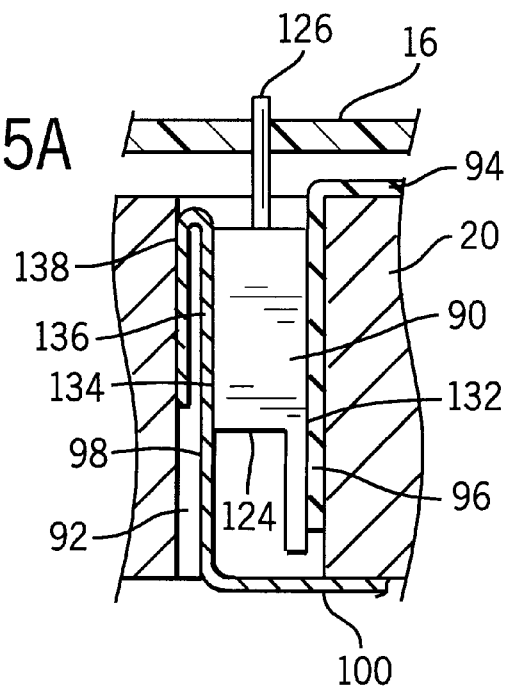
FIG. 5A is a detail sectional view of the assembly illustrated in FIG. 5, along line 5A—5A, showing a presently preferred arrangement for transmitting thermal energy from switching devices to a heat sink.

As shown in broken lines in FIG. 5, and in the sectional view of FIG. 5A, each lead frame 124 of power switching elements 90 is received within a corresponding recess 92 of rear end cap 20. Rear end cap 20 is preferably made of a thermally conductive material, such as aluminum. As mentioned above, during assembly of drive assembly 34, board 76 is fitted to rear end cap 20 and a sil pad 94 is positioned over a portion of rear end cap 20. Each switching element 90 forces an insulating extension 96 of sil pad 94 into each recess 92. Each insulating extension 96 is thus positioned between a lead frame package 124 and an inner surface of recess 92. In the presently preferred embodiment, sil pad 94, including insulating extensions 96, is stamped from an insulating material such as sheet material available under the commercial designation SP400.

Within each recess 92, a biasing member 98 of clip 100 urges a base 132 of lead frame 124 into tight contact against insulating extension 96 of sil pad 94, to promote thermal transfer from lead frame 124, through insulating extension 96 and thereby through rear end cap 20. Thus, each biasing member 98 is designed to fit between a side wall of recess 92 and a top surface 134 of each lead frame 124. Accordingly, each biasing member 98 includes a frame contacting portion 136 and a spring portion 138 bent back over frame contacting portion 136. Prior to installation, as illustrated in FIG. 8, spring portions 138 are positioned radially outwardly slightly from frame contacting portions 136. Clip 100 is preferably made of a light-weight resilient material, such as spring steel, such that as biasing members 98 are inserted between a side wall of a recess 92 and a lead frame 124, spring portion 138 is elastically deformed toward frame contacting portion 136. Because top surface 134 of lead frame 124 is non-conductive, switching element 90 remains electrically isolated from rear end cap 20. Moreover, insulating extension 96 of sil pad 94 effectively electrically insulates each lead frame 124 from rear end cap 20, while thermally coupling the lead frame to end cap 20 to promote conductive thermal transfer therethrough.

It should be noted that, while in the illustrated embodiment lead frames 124 are urged toward and thermally coupled to radially inner sides of recesses 92, lead frames 124 and clip 100 could alternatively be configured to dissipate thermal energy through radially outer sides of recesses 92, or through sides of recesses 92 oriented along radii of board 76, and so forth.

Several advantages flow from the foregoing structure, as will be readily appreciated by those skilled in the art. Firstly, by providing switching elements 90 in an upstanding position on circuit board 76, the overall size of the drive package is kept to a minimum. In addition, by thermally coupling power switching elements 90 to rear end cap 20, thermal transfer from the switching elements is greatly enhanced as compared to heretofore known drive systems, permitting the size of the drive to be further reduced. Similarly, by positioning the switching elements in radially spaced locations about board 76, an even temperature gradient is established through rear end cap 20 such that heat conducted from elements 90 is dissipated in a regular manner from recesses 92 toward the outer periphery of rear end cap 20. Furthermore, unlike heretofore known brushless DC motor drive packages, the foregoing structures permits rear end cap 20 to serve both as a drive and control circuit board support, as a heat sink, and as a mechanical support for rear bearing set 74 and shaft 22.

Figure 9:
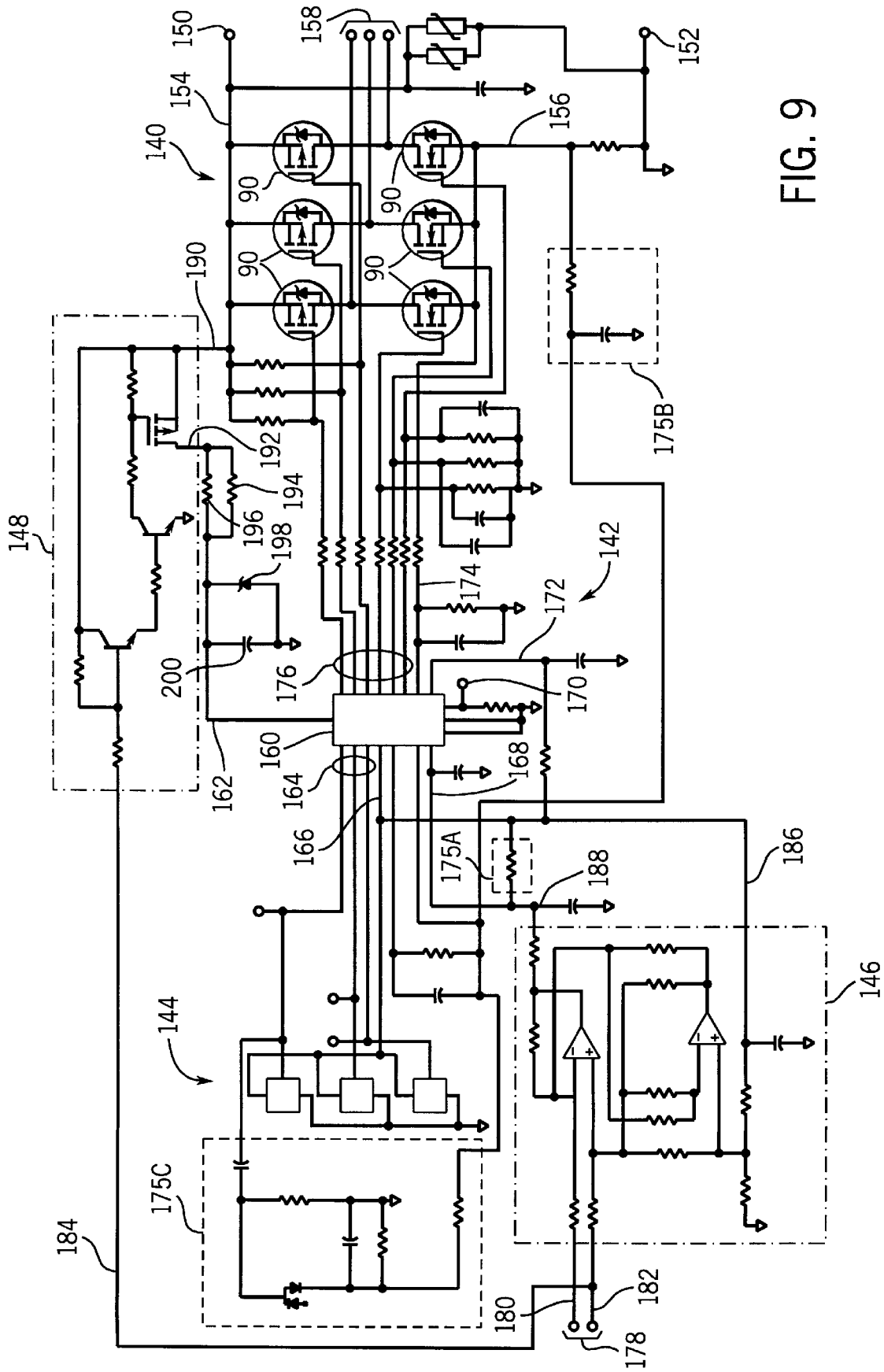
FIG. 9 is a diagrammatical view of a presently preferred electrical circuit for the drive, including drive circuitry, control circuitry, interface circuitry, and energy conservation circuitry.
Figure 9A:
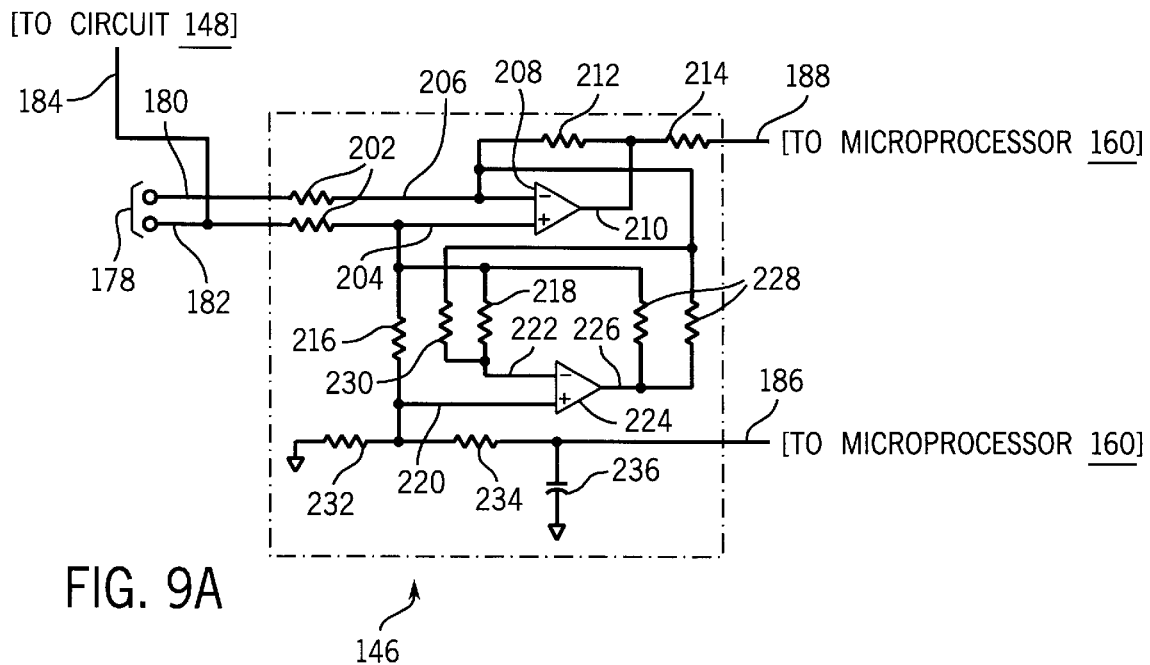
FIGS. 9A and 9B represent portions of the circuitry of FIG. 9 in greater detail, particularly suited for scaling incoming control signals and for conserving energy in the drive circuitry during periods when the electric motor is not being driven, respectively.
Figure 9B:
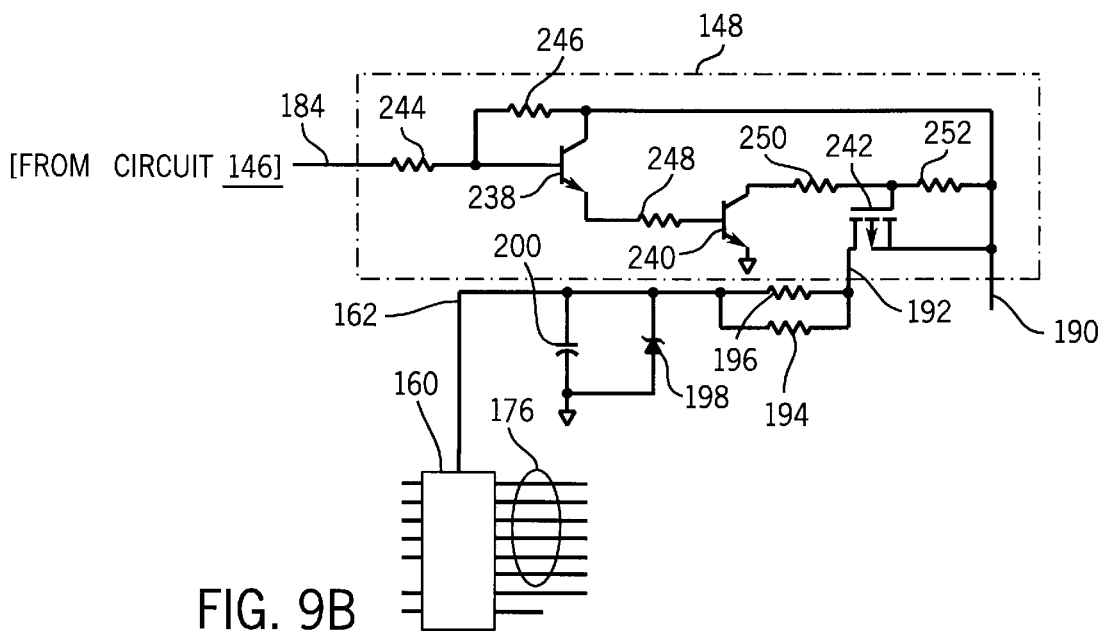

The presently preferred embodiment of drive 14 also includes advantageous configurations for drive circuitry as represented in FIGS. 9, 9A and 9B. Thus, as shown in FIG. 9, circuitry supported on board 76 includes a drive circuit 140, a control circuit 142, a commutation circuit 144, a signal conditioning circuit 146 and an energy conservation circuit 148. As will be appreciated by those skilled in the art, the preferred general arrangement of drive circuit 140, control circuit 142 and commutation circuit 144 shown in FIG. 9 may be of generally known construction. Therefore, although detailed components of these circuits have been represented in FIG. 9, they will only be described herein in detail as required to provide those skilled in the art with an understanding of the general operation of drive 14, and the particular operation of signal conditioning circuit 146 and energy conservation circuit 148.

Drive circuit 140 includes a plurality of switching elements 90, such as MOSFETs arranged in a three phase configuration. Drive 140 receives incoming power via terminals 150 and 152 from a source of energy, such as a battery system, alternator, generator, or other power supply circuitry of a known type. Moreover, drive circuit 140 may be configured to operate on a variety of power levels, such as 12 volts, 24 volts, and so forth. In addition, it should be noted that terminals 150 and 152 represented in FIG. 9 will generally correspond to two of the leads 24 extending from drive assembly 34 as described above.

Incoming power from terminals 150 and 152 is applied via DC bus lines 154 and 156 to power switching elements 90 as illustrated in FIG. 9. The conductive state of each switching element is controlled by control circuit 142 to produce three-phase output power which is conveyed to motor stator windings 42 (see e.g., FIG. 2), as indicated at terminals 158. As will be appreciated by those skilled in the art, each switching element 90 includes a solid state switch coupled in parallel with a flyback diode, permitting output power wave forms to be controlled to operate shaft 22 as desired. As mentioned above, the switch and flyback diode of each element 90 are preferably provided in a standard lead frame package. In the illustrated embodiment, output wave forms conveyed via terminals 158 are trapezoidal pulse width modulated wave forms having a duty cycle proportional to the desired control of motor 12.

Control circuit 142 includes a controller 160 configured to control the conductive states of switching elements 90 to maintain appropriate control of motor 12. In a presently preferred embodiment, controller 160 is a Motorola model MC33033DWR2 integrated circuit particularly designed for PWM DC motor drive control. Power is applied to controller 160 via a conductor 162 from energy conservation circuit 148. Feedback signals are applied to controller 160 via through feedback lines as indicated at reference numeral 164. As indicated at reference numeral 166, controller 160 furnishes a reference voltage output, such as 6 volts DC. A scaled command signal is applied to controller 160 via conductor 168. The manner in which the scaled command signal is generated by signal conditioning circuit 146 will also be described in greater detail below. Circuitry is also provided with controller 160 to permit reversing of motor 12, when desired, as indicated generally at reference numeral 170. A reference oscillation signal is provided for controller 160 as indicated at reference numeral 172. Controller 160 is also provided with a current feedback signal via conductor 174.

In operation, controller 160 is configured to receive the scaled command signal via conductor 168 and to control switching of elements 90 via output lines 176 based upon the scaled command signal and upon feedback signals received via input lines 164, to maintain the output of motor 12 at a level proportional to the scaled command signal. In a presently preferred embodiment, velocity command signals are applied to the drive and scaled which represent desired rotational velocities of the motor. However, command signals may represent other operating parameters, such as torque. As will be appreciated by those skilled in the art, feedback signals provided to controller 160 originate in commutation circuit 144, which preferably includes a series of Hall effect commutation sensors positioned on board 76 around the periphery of central aperture 122 adjacent to sensing magnet assembly 70. Commutation circuit 144 provides an indication of the angular position of shaft 22 by detecting fields emitted by sensing magnet assembly 70.

Also as illustrated generally in FIG. 9, additional circuit components may be associated with the foregoing circuitry to provide specialized functions. In the illustrated embodiment, three such optional circuits are shown. A first of these is a resistive circuit 175A which can be installed for open-loop operation of the drive. A second optional circuit is a torque control circuit 175B, which can be installed where the drive is to be employed as a torque control system. A third optional circuit is a control circuit 175C, which can be installed where the drive is to be employed for closed-loop control as in the preferred embodiment.

In addition to the foregoing circuitry, circuit board 76 preferably supports circuitry for regulating or normalizing input command signals, as well as circuitry for reducing the power consumption of controller 160 during periods in which motor 12 is not being driven. In particular, because drive 14 may be used in systems, such as blowers, refrigeration units, and so forth carried by motor vehicles and the like, variations in supply voltage applied to a command input device can result in corresponding variations in the input command signal, resulting in output which may vary in an undesirable manner due to the variations in the power supply voltage. In velocity control circuits, such variations typically result in driving the motor at speeds which do not correspond to the desired speed. Signal conditioning circuit 146 is designed to establish a uniform ground offset to reduce or eliminate the effects of such voltage variations. Also, it has been found that in heretofore known DC drive systems, control circuitry can draw currents on the order of 50 mA even where no command signal was being applied and the motor coupled to the drive was not being driven in rotation. Even such modest current levels can result in undesirable power consumption. Energy conservation circuit 148 is configured to significantly reduce the current drawn by drive 14 during such periods.

Returning to FIG. 9, signal conditioning circuit 146 receives command input signals from a source (as indicated generally at reference numeral 178), such as a manually operated potentiometer or an automatic controller (not shown). The command input signals are thus transmitted to circuit 146 via conductors 180 and 182. In addition, the command input signals are transmitted to energy conservation circuit 148 via conductor 184, electrically coupled to conductor 182. A reference voltage is supplied to signal conditioning circuit 146 via a conductor 186. Signal conditioning circuit 146 corrects variations in the input command signal and outputs a scaled command signal via conductor 188 which is, in turn, applied to controller 160 as indicated at reference numeral 168. The preferred structure and operation of signal conditioning circuit 146 is described below with reference to FIG. 9A.

Energy conservation circuit 148 receives the command input signal via conductor 184 and applies power to controller 160 via conductor 162 based upon the level of the input command signal. Circuit 148 receives incoming power via conductor 190 coupled to DC bus line 154. When energy conservation circuit 148 receives a command input signal via conductor 184 which is above a predetermined threshold (generally corresponding to a minimum allowable command), circuit 148 outputs power via a conductor 192. When the command input signal is below the predetermined threshold, circuit 148 interrupts power to conductor 192 as described in greater detail below. Power output via conductor 192 is filtered through a pair of parallel resistors 194 and 196 having values of 301 ohms. Downstream from resistors 194 and 196, power from circuit 148 is further filtered by a Zener diode 198 and a capacitor 200, coupled, in parallel, to ground. In the presently preferred embodiment, Zener diode 198 is a 24 volt diode, and capacitor 200 is a 10 microF capacitor. As will be appreciated by those skilled in the art, the foregoing filtering circuitry acts as a 24 volt limiting filter. Filtered power is then available to controller 160 via conductor 162.

Referring now more particularly to the preferred configuration of signal conditioning circuit 148, as best illustrated in FIG. 9A, circuit 146 receives a command input signal, as indicated at reference numeral 178, via conductors 180 and 182. In a presently preferred embodiment the command input signal varies between zero and 10 volts. The command input signal is then applied to a pair of resistors 202, each having a value of 499 Kohms. The command input signal is then transmitted via first and second inputs 204 and 206, respectively, to a first operational amplifier 208. Output 210 from operational amplifier 208 is fed back to input 206 through a 249 Kohm resistor 212. Output 210 is also conveyed to controller 160 along conductor 188 through a 9.76 Kohm resistor 214. As explained in greater detail below, output along conductor 188 is the corrected command signal used to drive motor 12.

Input 204 to first operational amplifier 208 is conveyed through first and second resistors 216 and 218 to inputs 220 and 222, respectively, of a second operational amplifier 224. Resistors 216 and 218 have resistance values of 249 Kohm and 20 Kohm, respectively. Output 226 of second operational amplifier 224 is fed back through a pair of 20 Kohm resistors 228 to the input side of second operational amplifier 224 as illustrated in FIG. 9A, as well as to input 206 of first operational amplifier 208. Moreover, downstream of one of resistors 228, output 226 from second operational amplifier 224 is fed back in parallel with resistor 218 to input 222 of second operational amplifier 224 through a 20 Kohm resistor 230. Input 220 of second operational amplifier 224 is coupled to ground through a 910 ohm resistor 232. Input 220 is also referenced through a 20 Kohm resistor 234 in conjunction with a 0.1 microF filter capacitor 236.

Signal conditioning circuit 146, configured as described above, functions as follows. An input command signal, such as a velocity command signal, is delivered to circuit 146 at terminals 178. Conductor 180 will typically be tied to a ground potential, such as a vehicle frame or the like. The components of circuit 146 filter the incoming signal from conductor 182 to establish an artificial ground at input 220 of second operational amplifier 224, by virtue of the relative values of resistors 232 and 234. Reference line 186, which is coupled from controller 160, conveys a 6 volt reference signal to the conditioning circuit 146. Moreover, operational amplifier 224 serves to balance current to input nodes 204 and 206 of first operational amplifier 208. Output 210 of first operational amplifier 208, scaled through resistor 214, represents a command signal which is substantially independent of voltage variations in the ground to which drive 14 is connected, providing reliable control. Moreover, as will be appreciated by those skilled in the art, where a system includes multiple motors driven by similar drives 14, each equipped with a signal conditioning circuit 146, all similarly commanded motors will be driven equally despite relative differences in the ground potential of the individual motors.

Referring now to FIG. 9B, energy conservation circuit 148 is preferably configured as follows. The input command signal transmitted to signal conditioning circuit 146 via conductor 182 (see FIG. 9A) is applied to circuit 148 via conductor 184. Also, as mentioned above, incoming power is applied to circuit 148 via conductor 190. Circuit 148 comprises a series of solid state switching devices including transistors 238 and 240, and a P channel power MOSFET 242 interconnected as illustrated in FIG. 9B. The input command signal conveyed via conductor 184 is applied to the base of transistor 238 through a 100 Kohm resistor 244. The signal is input to the base of transistor 238. A bias is also supplied from the collector of the same transistor through a 2.2 Mohm resistor 246 to the base. The emitter of transistor 238 is coupled to the base of transistor 240 through a 100 Kohm resistor 248. Moreover, the collector of transistor 240 is coupled to the source of direct current power, incoming through conductor 190, through a pair of 6.81 Kohm resistors connected in series, as indicated at reference numerals 250 and 252. The emitter of transistor 240 is coupled to ground. The gate of MOSFET 242 is coupled to the source of incoming power through resistor 252, while the source of MOSFET 242 is coupled to incoming power line 190.

Energy conservation circuit 148, configured as described above, functions as follows. When the input command signal applied via conductor 184 is below a predetermined threshold value, such as 400 to 500 mV, transistor 238 will remain in a non-conducting state. Accordingly, the base of transistor 240 will similarly be at a low voltage, placing transistor 240 in a non-conductive state. As a result, MOSFET 242 will remain in a non-conductive state, preventing power from being applied to controller 160 via conductor 192. When the input command signal rises above the predetermined threshold, such as above 500 mV, transistor 238 is switched to a conducting state, driving the base of transistor 240 to a higher voltage, and thus placing transistor 240 in a conducting state. As a result, the collector of transistor 240 will drop to a low voltage, causing MOSFET 242 to conduct power to output conductor 192. Thus, power conservation circuit 148 applies power to controller 160 only when the input command signal is above the predetermined threshold. Conversely, each time the input command signal drops below the threshold, power will be interrupted to controller 160, preventing excessive current draw during periods of non-operation, and consequently limiting the power consumption of the drive during such periods. It has been found that by virtue of circuit 148, current draw by the drive circuitry can be reduced to a leakage current on the order of 2 microA during periods in which circuit 148 interrupts power to controller 160.

Figure 10A:
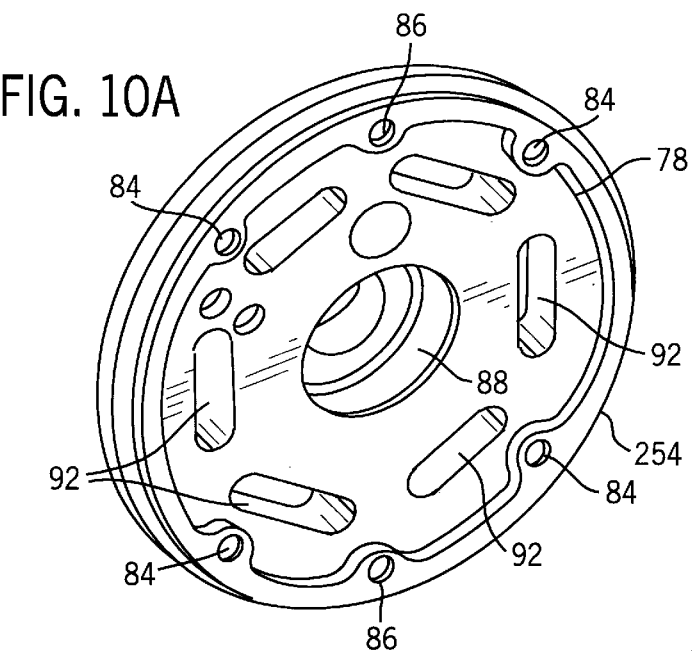
FIGS. 10A and 10B are perspective views of an alternative configuration for a heat sink and end cap for use in the electric motor and drive package illustrated in FIGS. 1 through 4.
Figure 10B:
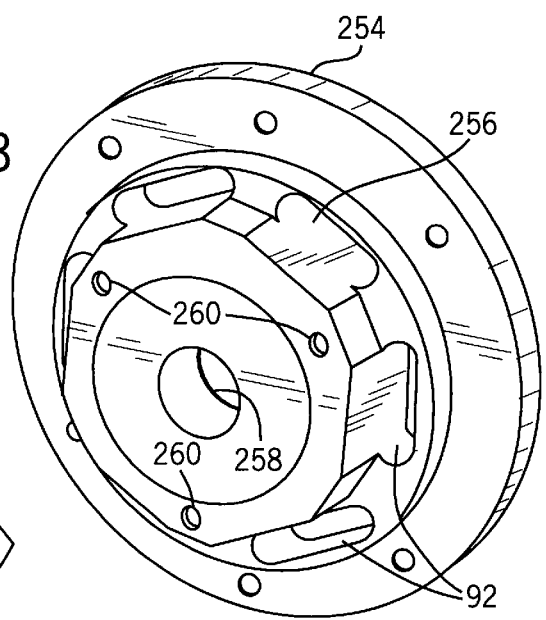

As mentioned above, the various components and subassemblies of motor and drive unit 10 can be adapted for specific applications in a variety of manners. FIGS. 10–12 illustrate certain of the alternative embodiments for rear end cap 20 currently contemplated. As illustrated in FIGS. 10A and 10B, in a first alternative embodiment, a rear end cap may be configured as an open support, designated generally by the reference numeral 254, having a rear extension 256 and a central aperture 258. Support 254 includes threaded apertures 84 for receiving fasteners used to support circuit board 76 within a recess as described above. Also, support 254 includes a series of recesses or apertures 92 in radially spaced locations for receiving switching elements 90 and for transmitting heat from the switching elements during operation. In the embodiment of FIGS. 10A and 10B, when inserted into recesses 92, the switching elements abut flat inner walls of each recess defined by extension 256 (see FIG. 10B). Also, while support 254 includes a bearing support recess 88 for receiving and supporting a rear bearing set as described above, aperture 258 permits the shaft of a motor to extend through the support. Accordingly, a support such as illustrated in FIGS. 10A and 10B, or a modification of that support, may be employed for converting the embodiment described above to a double-ended output shaft arrangement, such as, by way of example, for driving a pair of fans. Moreover, aperture 258 may also be used to pass certain products through the motor and drive unit as desired, such as through the use of a hollow shaft. Such supports and shafts may typically find application in fiber spinning and textile manufacturing industries. It should also be noted that a series of apertures 260 may be formed in support 254 (see FIG. 10B) for receiving fasteners for fixing of various components to support 254.

Figure 11A:
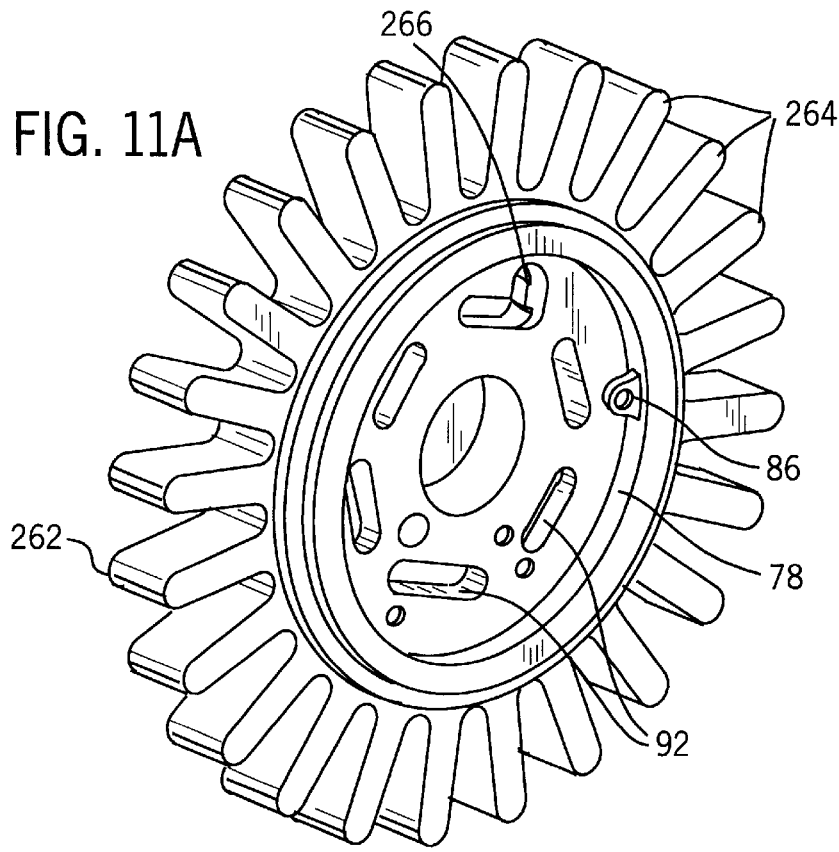
FIGS. 11A and 11B are perspective views of an additional alternative configuration for a heat sink and end cap for the electric motor and drive package.
Figure 11B:
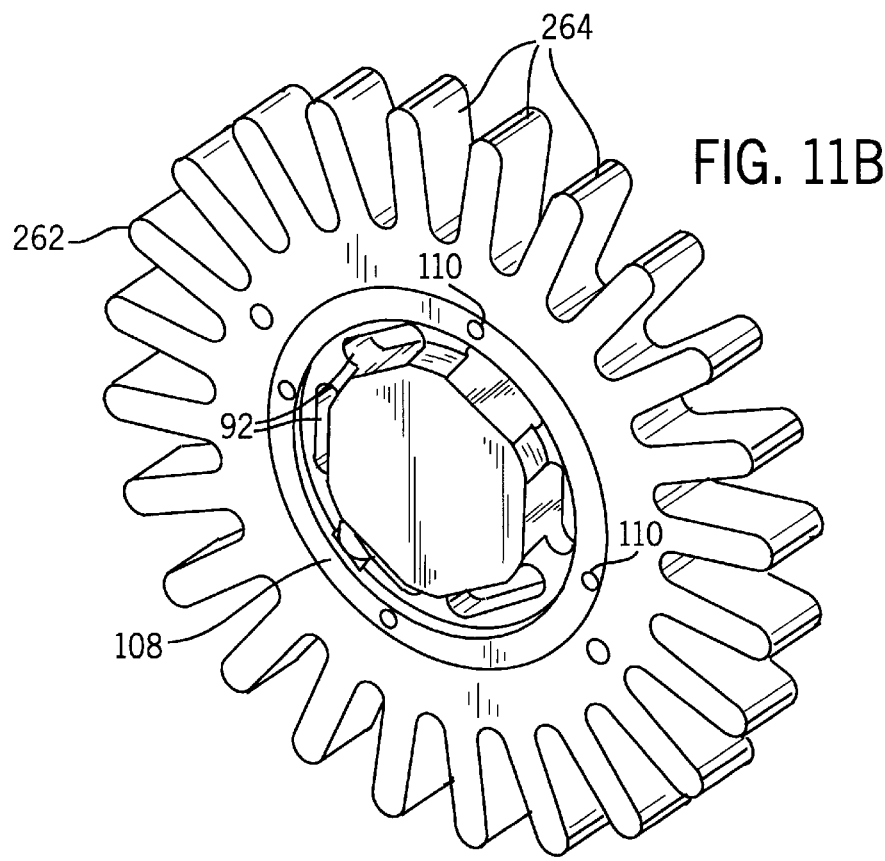
Figure 12:
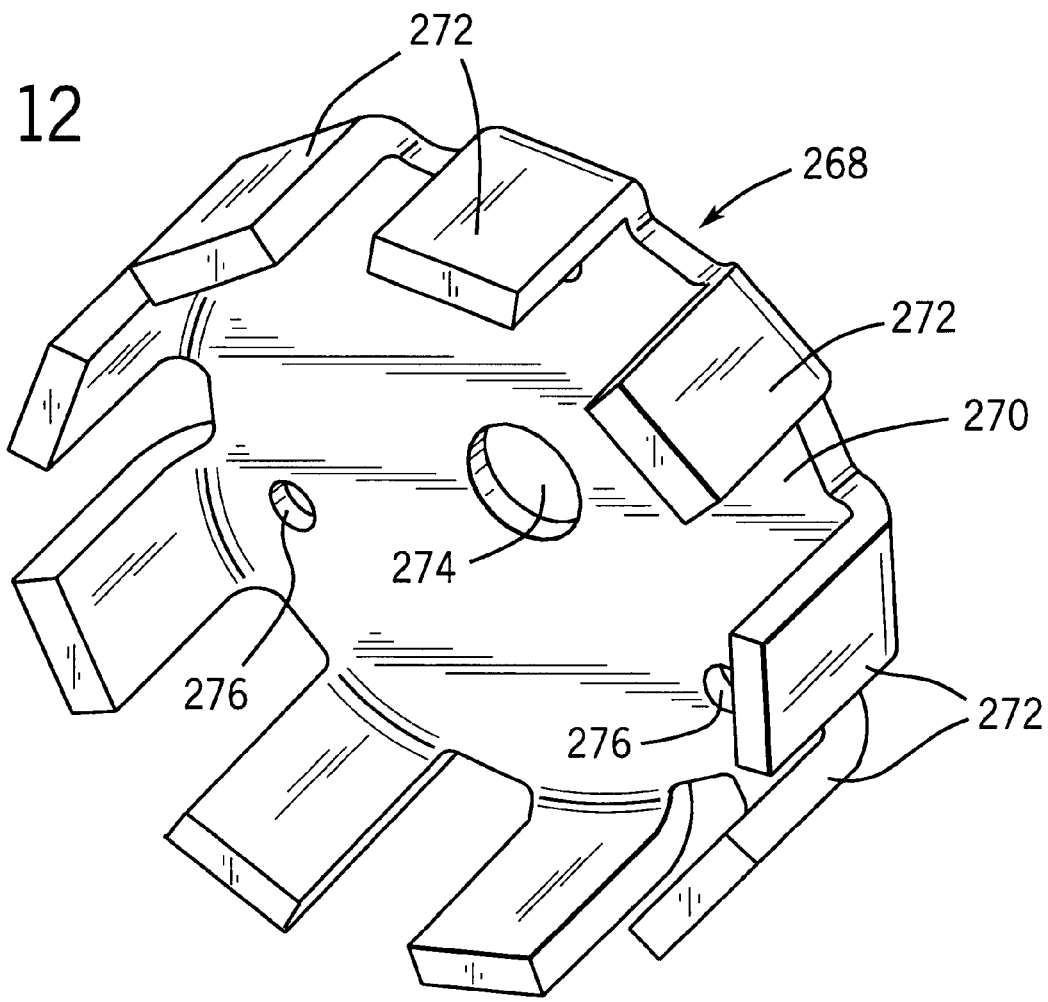
FIG. 12 is a perspective view of a further alternative configuration for a heat sink designed to be secured to an end cap of the types illustrated in FIG. 2, 10A and 10B.

Referring now to FIGS. 11A and 11B, in another alternative configuration, a support 262 for inclusion in a drive assembly of the type described above may include a series of peripheral fins 264 for dissipating heat generated by the drive circuitry supported thereon. As described above, support 262 includes features for receiving and supporting a circuit board as well as a shaft support bearing. Moreover, recesses 92 are provided as described above for receiving and transmitting heat from power switching components supported on the drive circuit board. Also, as illustrated in FIG. 11A, a routing passage 266 may be provided for leads (see, e.g., leads 24 shown in FIG. 3) extending from a circuit board supported by support 262.

FIG. 12 illustrates a heat sink configured for coupling to a support or end cap, such as support 254 illustrated in FIGS. 10A and 10B. In the illustrated embodiment, heat sink 268 includes a planar central portion 270 having integrally formed heat dissipating fins 272 extending about its periphery. A central aperture 274 is formed in heat sink 268 to permit the passage of a shaft or product therethrough, as mentioned above with respect to FIGS. 10A and 10B. Apertures 276 are provided in central portion 270 for receiving fasteners for fixing heat sink 268 to a support or end cap. For example, fasteners (not shown) may be inserted through apertures 276 and threaded into apertures 260 of a support or end cap of the type illustrated in FIG. 10B.

In addition to the foregoing alternative configurations, it should be noted that while in the illustrated embodiment drive assembly 34 is configured as a rear end cap, where appropriate, a similar assembly may include a central aperture, such as illustrated for support 254 in FIGS. 10A and 10B, permitting its use as a front end cap of motor 12. Moreover, apertures, such as apertures 110 shown in FIGS. 2 and 11B, or apertures 260 shown in FIG. 10B may be used to support motor and drive unit 10, rather than a mounting flange arrangement, such as flange 26 shown in FIGS. 2–4. As will be appreciated by those skilled in the art, the use of end cap 20 or the alternative supports described above to mount motor and drive unit 10 further eliminates an additional component from the motor and drive unit package.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A motor drive for driving a brushless DC motor at desired rotational velocities, the motor drive comprising:
    a drive circuit for converting electrical energy from a source to controlled pulsed energy;
    a control circuit coupled to the drive circuit, the control circuit generating control signals and applying the control signals to the drive circuit for regulating the pulsed energy based upon a corrected command signal representative of a desired operating parameter of the motor; and
    a command interface circuit, the interface circuit configured to receive an input command signal which is at least partially dependent upon a characteristic of the source, and to generate the corrected command signal based upon the input command signal, the corrected command signal being substantially independent of the characteristic of the source.

2. The motor drive of claim 1, wherein the input command signal is a voltage command signal having a voltage level representative of the desired rotational velocity of the motor and wherein the characteristic of the source is ground potential.

3. The motor drive of claim 1, wherein the command interface circuit is configured to generate a reference signal and to generate the corrected command signal based upon a comparison of the input command signal to the reference signal.

4. The motor drive of claim 3, wherein the reference signal is an artificial ground offset signal.

5. The motor drive of claim 1, further comprising a sleep mode circuit configured to interrupt electrical power to at least a portion of the control circuit.

6. The motor drive of claim 5, wherein the sleep mode circuit is coupled to the command interface circuit, and interrupts electrical power to the portion of the control circuit when the input command signal falls below a predetermined threshold level.

7. The motor drive of claim 1, wherein the command interface circuit includes first and second operational amplifiers, the first operational amplifier receiving the input command signal and generating a command correction signal based upon a ground reference signal, the second operational amplifier receiving the input command signal and the command correction signal and generating the corrected command signal based thereon.

8. A brushless DC motor and drive unit comprising:
    a brushless DC motor having a housing, a rotor disposed for rotation within the housing, and a stator disposed in the housing around a portion of the rotor, the stator configured to receive pulsed energy signals to drive the rotor in rotation;
    a drive circuit configured to be coupled to a source of electrical energy and to convert electrical energy to the pulsed energy signals;
    a control circuit coupled to the drive circuit, the control circuit generating control signals and applying the control signals to the drive circuit for controlling the pulsed energy signals based upon a command signal; and
    a signal conditioning circuit coupled to the control circuit, the signal conditioning circuit receiving an input signal which is at least partially dependent upon a characteristic of the source, the signal conditioning circuit generating the command signal from the input signal such that the command signal is substantially independent of the characteristic of the source.

9. The brushless DC motor and drive unit of claim 8, wherein the input signal is a voltage command signal having a voltage level representative of the desired rotational velocity of the motor and wherein the characteristic of the source is ground potential.

10. The brushless DC motor and drive unit of claim 8, wherein the signal conditioning circuit is configured to generate a reference signal and to generate the command signal based upon a comparison of the input signal to the reference signal.

11. The brushless DC motor and drive unit of claim 8, further comprising a sleep mode circuit configured to interrupt electrical power to at least a portion of the control circuit.

12. The brushless DC motor and drive unit of claim 11, wherein the sleep mode circuit is coupled to the signal conditioning circuit, and interrupts electrical power to the portion of the control circuit when the input signal falls below a predetermined threshold level.

13. The brushless DC motor and drive unit of claim 12, wherein the predetermined threshold level corresponds to a motor command substantially equal to zero.

14. The brushless DC motor and drive unit of claim 8, wherein the signal conditioning circuit includes first and second operational amplifiers, the first operational amplifier receiving the input signal and generating a command correction signal based upon a reference signal, the second operational amplifier receiving the input signal and the command correction signal and generating the command signal based thereon.

15. A motor drive for controlling a brushless DC motor based upon a command signal, the motor drive comprising:

a drive circuit configured to be coupled to a source of energy and to convert the energy to pulsed energy signals;

a control circuit coupled to the drive circuit, the control circuit generating control signals and applying the control signals to the drive circuit for controlling the pulsed energy signals; and an energy conservation circuit coupled to the control circuit, the energy conservation circuit configured to receive a control signal and to complete a current carrying path to the control circuit when the control signal is above a predetermined threshold level and to interrupt the current path to the control circuit when the control signal is at or below the predetermined threshold level.

16. The motor drive of claim 15, wherein the predetermined threshold level corresponds to a motor command of substantially zero.

17. The motor drive of claim 15, wherein the energy conservation circuit includes a solid state switching device coupled between a source of electrical energy and the control circuit, and wherein the energy conservation circuit completes and interrupts the current carrying path to the control circuit by changing conductive states of the solid state switching device.

18. The motor drive of claim 15, further comprising a command interface circuit configured to receive an input command signal at least partially dependent upon a ground potential of the source and to generate a corrected command signal based upon the input command signal such that the corrected command signal is substantially independent of the ground potential of the source, the control circuit generating the control signals based upon the corrected command signal, and wherein the control signal received by the energy conservation circuit is substantially equal to the input command signal.

* * * * *